Sept. 13, 1960  F. B. NEARY  2,952,187
SPECTACLE FRAME
Filed Aug. 19, 1959
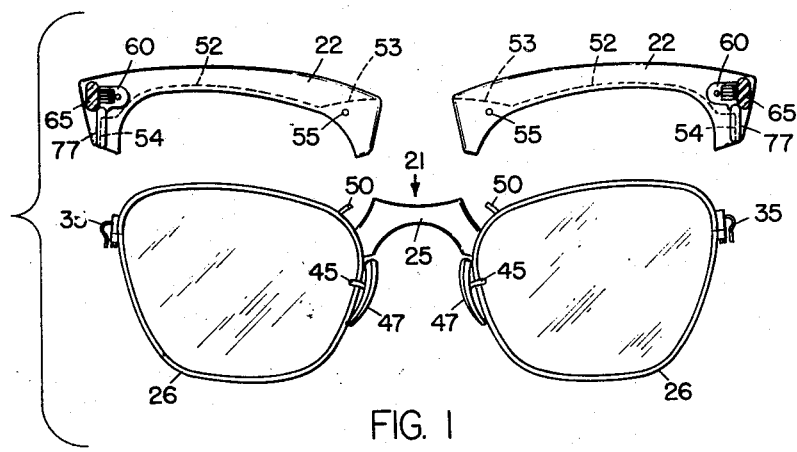
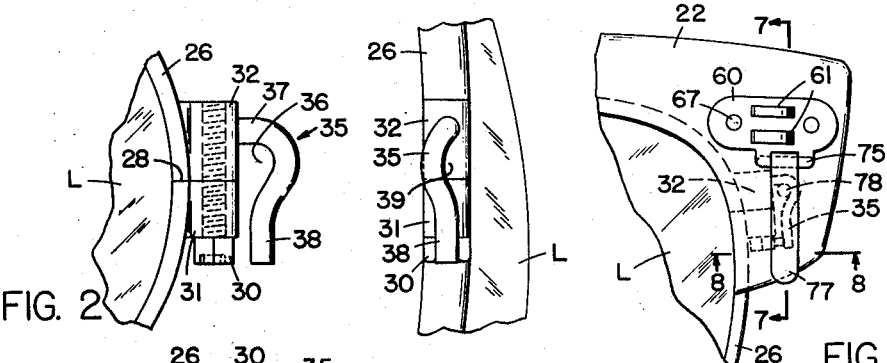
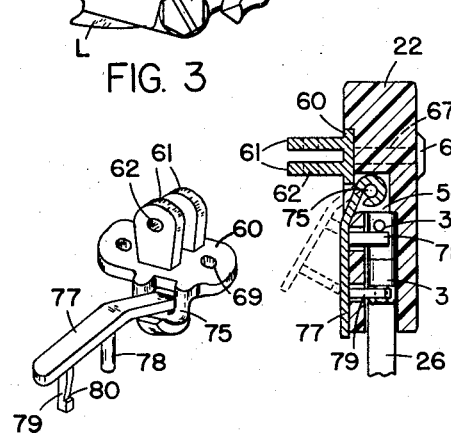
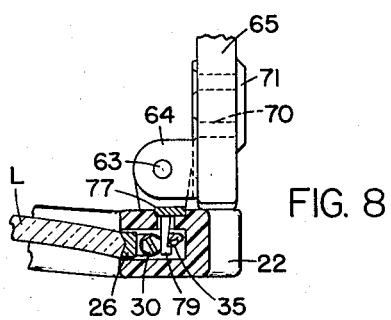
INVENTOR.
FRANCIS B. NEARY
BY
Attorney United States Patent Office 2,952,187
Patented Sept. 13, 1960

2,952,187
SPECTACLE FRAME

Francis B. Neary, Rochester, N.Y., assignor to Textron Inc., Providence, R.I., a corporation of Rhode Island Filed Aug. 19, 1959, Ser. No. 834,714

5 Claims. (Cl. 88—41)

The present invention relates to spectacle frames, and more particularly to combination metal and plastic spectacle frames. In a more specific aspect, the invention relates to that type of combination metal and plastic frame in which the lenses are mounted in a metal chassis which includes the bridge, and there are plastic top arms or semi-rims secured to the chassis which extend over the top edges of the lenses and partially conceal the metal eyewires. Still more specifically the invention constitutes an improvement over the spectacle frames disclosed in my pending application Serial No. 693,730.

Combination metal and plastic spectacle frames are very popular today because they afford color and variety in design while providing a good, secure mounting for the lenses. However, conventional combination frames have the plastic top rims fixedly secured to the metal chassis.

Many persons like to have at hand, ready for optional use, spectacles of different colors and/or design to harmonize with different dress accessories or different apparel, or to suit different occasions or purposes. Because conventional combination spectacle frames are made so that the lenses are permanently fixed therein, manufacturers of spectacle frames, opticians, and optometrists have had to maintain large inventories of various sizes, colors, designs, and shapes of such frames in order to satisfy the requirements and tastes of the public. Moreover, any individual spectacle user, who has desired to have spectacle frames of conventional construction in different colors, and/or designs, has had to buy the corresponding number of complete spectacles, lenses included. This is expensive because the cost of the lenses constitutes a large part of the cost of any spectacle.

Different suggestions have been made at various times for providing combination metal and plastic spectacle frames with removable lenses, so that the lenses could be removed from one frame by the wearer and inserted into another frame. None of these prior proposals have achieved commercial success because few people are good enough mechanics to be successful in assembling such delicate mechanisms as ophthalmic mountings. Professional practitioners, such as ophthalmologists and optometrists, moreover, do not look with favor on patient's changing lenses from one frame to the other. They fear that the patient may upset the fine corrections required for satisfactory functioning of a prescription, which has been carefully worked out to meet the exact conditions found in refraction of an individual patient's eyes. They fear that the corrective lenses will not function as they are supposed to, with consequent discomfort to the patient, or in extreme cases, perhaps actual damage to the patient's vision, if the patient starts changing lenses from one spectacle frame to another himself.

The invention of my pending application Serial No. 693,730 above mentioned was devised in order to avoid these prior objections and to provide a spectacle frame structure which will permit interchange of lenses so that with but a single pair of lenses a plurality of different spectacle frames can be built up, or assembled.

Another object of the invention of the prior application mentioned was to provide a spectacle frame construction which will permit interchange of lenses while insuring that the axes of the lenses are in correct optical position when assembled in the frame.

Another object of the invention of the prior application was to provide a spectacle frame construction for interchangeable lenses, which is simple enough for a person, who cannot see well without glasses, to make a change of lenses from one spectacle frame to another readily by a sense of touch, even in the dark.

The primary object of the present invention is to provide a spectacle frame which will achieve the purposes of the frame of my application above-mentioned but with a somewhat simpler, less expensive construction.

Another object of the invention is to provide a spectacle frame of the character described having improved means for securing the non-metallic parts of the frame to the metallic parts thereof, and which will facilitate change of lenses from one frame to another.

Another object of the invention is to provide a spectacle frame of the character described, in which more efficient means is provided for securing the respective plastic overlays or top rims to the lens chassis which also serves to prevent the screws, which fasten the eyewires about the lenses, from unintentionally loosening.

More generally, another object of the invention is to provide a spectacle frame structure such that, while using only a single pair of lenses, a person can nevertheless form selectively, and at will, a plurality of different spectacle frames of different color and design, to harmonize, as desired, with a particular costume, or to suit a particular occasion.

Another object of the invention is to provide a spectacle frame structure, which will enable anyone, to use interchangeably different sets of lenses, for instance, clear lenses, and sun-glasses, with a given frame.

A still further object of the invention is to provide an improved spectacle frame of the type described which will be durable in construction and easy to use.

Other objects of the invention will be apparent hereinafter from the specification and from the recital of the appended claims.

In the drawing:

Fig. 1 is an exploded view showing the plastic overlays, or semi-rims, and the metallic chassis of a frame constructed according to one embodiment of the present invention with the overlays or semi-rims separated from the chassis;

Fig. 2 is a fragmentary rear view on an enlarged scale showing part of an eyewire, the tubes for securing the eyewire together about a lens, and the retaining hook which is attached to the anchor tube;

Fig. 3 is a bottom plan view of the parts shown in Fig. 2;

Fig. 4 is a side elevation of the parts shown in Fig. 2;

Fig. 5 is a fragmentary rear view showing a plastic overlay or semi-rim mounted over the eyewire and showing the retaining latch in engaged position, the temple being removed;

Fig. 6 is a perspective view of one of the hinge members of the frame and of the associated latch member;

Fig. 7 is a section on the line 7—7 of Fig. 5 looking in the direction of the arrows; and Fig. 8 is a section on the line 8—8 of Fig. 5 looking in the direction of the arrows.

Referring now to the drawing by numerals of reference, 21 denotes the metallic chassis; and 22 designates the plastic top arms or semi-rims of a spectacle frame made according to one embodiment of this invention, said plastic arms or semi-rims being preferably made of plastic material sold under the trade-mark "Zylonite."

The metallic chassis comprises a bridge 25, and a pair of lens holders or eyewires 26. The eyewires hold the lenses L of the spectacle. Each eyewire is made of a suitable metal, for instance, gold, or gold-filled, and is shaped to encircle and enclose one of the lenses of the spectacle. Each eyewire is split, as denoted at 28 (Fig. 3), so that it may be opened to permit insertion into it or removal from it of a lens L. Each eyewire is secured together about its lens by a hex-headed screw 30. Each screw is passed through a lug or tube 31 that is soldered or otherwise joined to one end of the associated eyewire; and each screw threads into an anchor lug or tube 32 that is soldered or otherwise secured to the other end of this eyewire to abut against the tube 31 when the screw is threaded home into the associated anchor tube 32.

Soldered or otherwise secured to the anchor tube 32 is a hook 35. The hook 35 is bent to have an arcuate concave fillet 36 formed on its inside at the junction of the horizontally projecting portion 37 and its generally vertically extending portion 38. The vertically-extending portion 38 is bent laterally to have another curve or fillet portion as denoted at 39. This makes the hook more resilient. The downwardly depending portion extends downwardly generally parallel to and offset from the tube 31 to a position abreast of or below the head of the screw 30 when the screw is fully threaded into the anchor tube 32.

The eyewires 26 are soldered or otherwise secured to the bridge 25, which may be made of gold, or other metal, and in effect, the eyewires and the bridge are integral with one another and constitute a metal chassis holding securely a pair of lenses. Each of the eyewires has an arm 45 soldered or otherwise secured to it which carries a conventional nasal pad 47. Each of the eyewires also has a hook 50 soldered or otherwise secured to it adjacent the nasal end of the top portion of the eyewire. The two hooks 50 project toward one another, and toward the body portion of the bridge 25.

Each plastic overlay or top rim 22 is grooved in its bottom face, as denoted at 52 (Fig. 1), to receive and conceal the upper reach of the associated eyewire 26. Each overlay or semi-rim is also grooved along its nasal edge as denoted at 53 to straddle and conceal the hook 50 and the adjacent portion of the bridge 25. Each overlay or semi-rim is further recessed at its temporal end, as denoted at 54 (Figs. 1 and 7), to receive the tubes 31 and 32 of the eyewire and the hook 35 and the parts associated therewith, as will be described further hereinafter. The grooves 53 and 54 communicate with the groove 52 in each overlay or top rim.

Secured in each overlay or top rim 22 to extend transversely of the groove 53 is a pin 55 (Fig. 1). The hooks 50 are adapted to engage over the pins 55 to secure the semi-rims at their nasal ends detachably to the metal lens-carrying chassis.

Each overlay or semi-rim 22 is recessed on its back face adjacent its temporal edge to receive a hinge plate 60. Each hinge plate is formed on its rear face with two parallel, rearwardly projecting ears 61. These ears are drilled, as denoted at 62, to receive a hinge pin 63 (Fig. 8) by means of which the hinge plate 60 is hingedly connected with that part 64 of the hinge which is fastened to the associated temple or bow 65 of the spectacle.

Each hinge plate 60 may be secured to its semi-rim or overlay by means of rivets 67 (Fig. 5) that are integral with a decorative shield 68 (Fig. 7) that is located against the front face of the semi-rim. The rivets 67 pass through the associated plastic semi-rim 22 and through the holes 69 in the associated hinge plate, and are anchored in the associated hinge plate, so that none of the strains on the hinge are transmitted to the plastic of the associated semi-rim. The temples 65 are secured in similar manner to the hinge plates 64, each hinge plate 64 being secured to its temple 65 by rivets 70 (Fig. 8) that are integral with a decorative shield or plaque 71 which is located against the outside face of the temple.

Soldered or otherwise secured to each hinge plate 60 is a bar 75 (Fig. 6) which extends forwardly and downwardly from the hinge plate into the recess 54 (Fig. 7) in the associated top rim. This bar may be U-shaped as shown, or may be of L-shape with only one leg soldered or secured to the hinge plate, or it may be of any other suitable construction. Pivotally mounted on the transverse portion of each bar 75 is a latch 77. One end of the latch may be curled on itself, as clearly shown in Fig. 7, or a separate tube may be soldered on one end of it, to engage around the transverse portion of the bar 75 to form the pivotal connection.

Each latch member has two pins 78 and 79 (Fig. 6) projecting forwardly therefrom at right angles to the pivotal axis of the latch, and spaced from one another and from said pivotal axis. The pin 78 of each latch is adapted to engage in the notch 36 of the associated hook 35 when the latch is swung down from the dotted line position shown in Fig. 7 to the full line position shown in that figure. The pin 79 of each latch is notched on its laterally outside face, as indicated at 80 (Fig. 6). When the latch is swung into operative position, this pin enters between the depending arm 38 of the hook and the adjacent peripheral face of the head of the screw 30, as shown in Fig. 8, thereby to wedge the hook in locking position, and simultaneously to lock the screw 30 against rotation. In the spectacle frame of the present invention, therefore, the locking means for securing a semi-rim or overlay on the chassis becomes simultaneously, in cooperation with the associated hook 35, a means for locking the fastening screw of the associated eyewire against involuntary rotation.

In assembling the spectacle, the lenses are inserted in the two eyewires 26. Then each screw 30 is passed through the tube 31 of the associated eyewire and threaded home into the anchor tube 32 thereof. Then the pin 55 of one of the semi-rims 22 is engaged under one of the hooks 50 of the chassis, and the semi-rim is rocked down to seat the upper reach of the associated eyewire in the groove 52 of the semi-rim and to position the groove 54 of the semi-rim over the associated tubes 31 and 32. Then the associated latch 77 is rocked downwardly from the dotted line position of Fig. 7 to the full line position of that figure to engage the pin 78 in the notch 36 of the hook 35, and to engage the pin 79 between the portion 38 of the hook 35 and the head of the associated screw 30. In similar manner the other semi-rim is secured to the other eyewire at the opposite side of the bridge.

Te depending arm 38 of each hook 35 is close enough to the associated tube 31 and to the head of the associated screw 30 to wedge the pin 79 between the hook 35 and the screw head to resiliently and frictionally lock the latch 77 in place and at the same time to hold the associated screw 30 against rotation.

To remove the overlays or top rims from the chassis, all that is required is to insert the thumbnail under each latch 77, and to rock the latch upwardly to unlock the overlay or semi-rim from the metal chassis at the temporal end of the overlay or semi-rim. Then the overlay or semi-rim is rocked upwardly to disengage its pin 55 from the associated hook 50.

The respective temples are hinged to the respective overlays or semi-rims so that they are removed from or placed on the chassis when the semi-rims are removed from or placed on the chassis, respectively.

From the above description, it will be seen that any user of eyeglasses can with mountings constructed according to the present invention readily change a set of semi-rims of one color or design for a set of another color or design, and can just as readily change a set of semi-rims from one pair of lens mounts to another as, for instance, from a chassis carrying clear lenses to a chassis carrying sun or dark glasses. Because the lenses remain in the lens mount during the change of the semi-rims there is no danger of the user upsetting the fine correction required for satisfactory functioning of the lenses. The metal chassis insures that the axes of the lenses cannot be turned from their correct positions in the frame. Because the lenses are mounted in a metal chassis, the mounting is stable. The supporting chassis, moreover, limits possibility of breakage of the lenses should they be dropped during interchange.

Because the semi-rims are held on the chassis by latches that are readily operable manually, it takes but an instant to change semi-rims from one mounting to another, or to take off one set of semi-rims from a mounting and replace the set with another. Thus, with the present invention a lady can change the color of her spectacles to suit the color of her dress by simply taking off one set of semi-rims and replacing them with a set of a suitable color. For evening wear the lady can use a more elaborate set of semi-rims than for work-day use. Furthermore, a person can purchase two mountings, one for clear lenses, and another for sunglasses, for instance, and change semi-rims from one mounting to another to suit his or her pleasure or convenience.

The latch can be manipulated in the dark by any person. It is not required to be wearing glasses in order to change semi-rims on a chassis. A person does not have to be a mechanic to remove a set of semi-rims from a chassis and to assemble another set thereon. The mounting is foolproof and simple enough in operation so that a person who cannot see well without glasses can make a change of semi-rims readily, solely by the sense of touch. There are no parts to get out of order. No tool whatsoever is required in shifting a set of semi-rims from one chassis to another, or in changing one set of semi-rims for another.

Obviously, instead of providing separate top arms or overlays for each lens holder, the two top arms could be made as one piece integral with a plastic bridge; and the whole top piece, comprising bridge and top arms, could be secured to the eyewires by latches 77. The latches again would serve two purposes, namely, securing of the top arms to the eyewires and the locking of the screws of the eyewires. Other modifications of the invention are also possible.

The provision of the hook makes it easier to manufacture the anchor tube 32. It also has some additional advantages from a manufacturing standpoint; and also, because of the fact that due to the length of the hook it is more resilient and offers more "snap-action" in retaining the notched locking pin 79. The notched portion 34—35 of my earlier application Serial No. 693,730, filed October 31, 1957 has to be soldered very accurately to the tube portion 32 of the eyewire so that the pin 68 will go into it. With the construction of the present application the hook can be soldered to the tube 32 and readily bent to fit the latching pin. Moreover, the hook is resilient.

While the invention has been described, then, in connection with a specific embodiment thereof, it will be understood that it is capable of further modification, and this application is intended to cover any variations, uses, or adaptations of the invention following, in general, the principles of the invention and including such departures from the present disclosure as come within known or customary practice in the art to which the invention pertains and as may be applied to the essential features hereinbefore set forth, and as fall within the scope of the invention or the limits of the appended claims.

Having thus described my invention, what I claim is:

1. A spectacle mounting comprising a pair of metallic eyewires, each adapted to surround a lens and each having its ends adjoining and having a pair of opposed tubular lugs secured to said adjoining ends, and disposed one above the other, a screw positioned in one of the lugs of each eyewire and threadably engaging the other lug of the eyewire to fasten the eyewire about the lens mounted therein, said screw having a head of polygonal shape in cross-section, a plastic top rim associated with each eyewire and having a groove in its bottom to receive the top portion of the eyewire, and means for detachably securing each top rim to its associated eyewire comprising a hook having two arms which are angularly disposed to one another and which are connected by a curved fillet, one of said arms projecting laterally by from the upper of said lugs and the other arm extending downwardly alongside of but spaced from the other lug, and a latch pivotally mounted on the top rim to swing downwardly to operative position, each latch having a pair of parallel pins mounted in it to project therefrom at right angles to the pivotal axis of the latch and spaced from one another radially of said pivotal axis, the pin which is closer to said pivotal axis being disposed to engage in said fillet when the latch is in operative position, and the other pin being disposed to be wedged between said other arm and the head of said screw to hold said screw against rotation when the latch is in operative position.

2. A spectacle mounting as claimed in claim 1, in which each said hook is resilient.

3. A spectacle mounting as claimed in claim 1, wherein each said hook is a resilient wire hook and has a fillet bent into its said other arm to increase its resiliency.

4. A spectacle mounting comprising a pair of metallic eyewires, each adapted to surround a lens and each having its ends adjoining and having opposed tubular lugs secured to said adjoining ends which are disposed one above the other, a screw positioned in one of the lugs of each eyewire and threadedly engaging the other lug of the eyewire to fasten the eyewire about the lens mounted therein, said screw having a head of polygonal shape in cross-section, a plastic top rim associated with each eyewire and having a groove in its bottom to receive the top portion of the eyewire, a metallic hinge plate secured to each top rim at the temporal end thereof for hingedly connecting a temple thereto, and means for detachably securing each top rim to its associated eyewire comprising a resilient wire hook having two arms which are angularly disposed to one another and which are connected by a curved fillet, one of said arms projecting laterally from the upper of said lugs and the other of said arms extending downwardly alongside of but spaced from the other lug, and a latch pivotally mounted on the hinge plate of the top rim to swing downwardly to operative position, each latch having a pair of parallel pins mounted thereon to project therefrom at right angles to the pivotal axis of the latch and spaced from one another radially of said pivotal axis, the pin which is closer to said pivotal axis being disposed to engage in said fillet when said latch is in operative position, and the other pin being disposed to be wedged between said other arm and the head of said screw to hold said screw against rotation when said latch is in operative position.

5. A spectacle mounting as claimed in claim 4 wherein said hinge plate has two ears by which it may be hingedly connected to a temple, said latch is pivotally connected to the hinge plate below said ears, and said other arm of said hook has a fillet in it to increase its resiliency.

No references cited.